(12) United States Patent
Clabau et al.

(10) Patent No.: US 9,512,980 B2
(45) Date of Patent: Dec. 6, 2016

(54) LAMINATED GLASS PANEL INCLUDING PHOSPHORS

(71) Applicant: SAINT-GOBAIN GLASS FRANCE, Courbevoie (FR)

(72) Inventors: Frédéric Clabau, Paris (FR); Harayer Chilinguirian, Bagnolet (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/652,294

(22) PCT Filed: Dec. 17, 2013

(86) PCT No.: PCT/FR2013/053109
§ 371 (c)(1),
(2) Date: Jun. 15, 2015

(87) PCT Pub. No.: WO2014/102482
PCT Pub. Date: Jul. 3, 2014

(65) Prior Publication Data
US 2015/0308659 A1    Oct. 29, 2015

(30) Foreign Application Priority Data
Dec. 24, 2012    (FR) .................................. 12 62744

(51) Int. Cl.
*B32B 17/10*        (2006.01)
*F21K 99/00*        (2016.01)
(Continued)

(52) U.S. Cl.
CPC ........... *F21V 9/16* (2013.01); *B32B 17/10045* (2013.01); *B32B 17/10174* (2013.01);
(Continued)

(58) Field of Classification Search
CPC .......... G09F 19/12; G09F 19/14; G09F 19/18; G09F 13/18; G09F 13/0816; G02B 27/01; G02B 27/0101; G02B 2027/012; G02B 2027/0118; B32B 17/10036; B32B 17/10669; B32B 17/10541; B32B 17/10009
(Continued)

(56) References Cited

U.S. PATENT DOCUMENTS 6,055,088 A * 4/2000 Fix .......................... B32B 17/10
359/265
6,064,521 A * 5/2000 Burke .................... G02B 27/26
348/E5.137
(Continued)

FOREIGN PATENT DOCUMENTS

WO    WO 02/058402 A2    7/2002
WO    WO 2010/139889 A1    12/2010

OTHER PUBLICATIONS

International Search Report as issued in International Patent Application No. PCT/FR2013/053109, dated Apr. 9, 2014.
(Continued)

*Primary Examiner* — Anh Mai
*Assistant Examiner* — Arman B Fallahkhair
(74) *Attorney, Agent, or Firm* — Pillsbury Winthrop Shaw Pittman LLP

(57) ABSTRACT

A glazing unit includes sheets of glass and of plastic laminated between the glass sheets, and luminophores, wherein the glazing unit includes at least three glass sheets and at least two plastic films inserted in alternation between the glass sheets.

24 Claims, 1 Drawing Sheet

(51) Int. Cl.
*F21V 9/16* (2006.01)
*G02B 27/01* (2006.01)
*F21Y 101/02* (2006.01)

(52) U.S. Cl.
CPC .. *B32B 17/10247* (2013.01); *B32B 17/10541* (2013.01); *B32B 17/10669* (2013.01); *B32B 17/10761* (2013.01); *F21K 9/56* (2013.01); *G02B 27/01* (2013.01); *G02B 27/0101* (2013.01); *B32B 2250/05* (2013.01); *B32B 2250/42* (2013.01); *B32B 2307/422* (2013.01); *B32B 2605/006* (2013.01); *F21Y 2101/02* (2013.01); *G02B 2027/0127* (2013.01); *G02B 2027/0194* (2013.01)

(58) Field of Classification Search
USPC ........... 362/84, 235, 308, 606, 503, 559, 230,362/293, 351, 311.02, 510; 359/22, 24, 630
See application file for complete search history.

(56) References Cited

U.S. PATENT DOCUMENTS

| | | | | |
|---|---|---|---|---|
| 7,660,024 | B2* | 2/2010 | Aye | G02B 5/32 359/22 |
| 8,339,332 | B2* | 12/2012 | Kanou | B32B 17/10036 345/7 |
| 9,297,935 | B2* | 3/2016 | Santos | G02B 6/0021 |
| 2005/0002081 | A1* | 1/2005 | Beteille | B32B 17/10045 359/275 |
| 2008/0018641 | A1 | 1/2008 | Sprague et al. | |
| 2011/0073773 | A1* | 3/2011 | Labrot | B32B 17/10 250/461.1 |
| 2012/0188652 | A1 | 7/2012 | Kang et al. | |

OTHER PUBLICATIONS

Written Opinion of the International Searching Authority as issued in International Patent Application No. PCT/FR2013/053109, dated Jun. 30, 2015.

* cited by examiner

LAMINATED GLASS PANEL INCLUDING PHOSPHORS

CROSS-REFERENCE TO RELATED APPLICATIONS

This application is the U.S. National Stage of PCT/FR2013/053109, filed Dec. 17, 2013, which in turn claims priority to French Application No, 1262744, filed Dec. 24, 2012. The contents of all of these applications are incorporated herein by reference in their entirety.

The invention relates to a laminated glazing unit comprising at least two substrates made of glass and plastic laminated between the glazing substrates, the glazing unit comprising luminophores that, when they are excited by illumination of suitable wavelength, in particular UV radiation, generate one or more images that may be seen on the glazing unit.

It is known in the automotive and aeronautic fields to incorporate luminophores into a laminated glazing unit, such as a windshield, in what are called head-up display systems (HUDs—for head-up displays), in order to generate data items that may be seen by the driver when the luminophores are excited. The actual image formed on the glazing unit is perceived by the driver in the form of a flat two-dimensional image.

This technique using luminophores could be applied to the architectural field in order to provide a transparent esthetic panel on which a sign or a logo could, for example, be displayed if desired.

However, the image produced would be flat and two-dimensional, without relief. It would be desirable, for this type of application, to display patterns or information in three dimensions with a perspective effect, increasing the perceived depth of the image or writing displayed.

The aim of the invention is to provide a laminated glazing unit comprising luminophores intended, under luminous excitation, to produce an image in relief.

The invention more particularly relates to the architectural field in which the glazing unit plays the role of a decorative and/or functional object, the glazing unit being transparent except when it is illuminated under a wavelength corresponding to the excitation of the luminophores, so as to display on said glazing unit decorations and/or information with a perspective effect.

The expression "architectural field" is understood to mean any application related to private or industrial, interior or exterior architectural constructions or even related to boat or airplane cabins, automotive vehicle passenger compartments, train passenger compartments, etc.

Many applications may be envisioned and, non-exhaustively, mention may be made of the use of the glazing unit of the invention as a partitioning element; a window; a storefront; a floor, wall or even ceiling tile; a glazed door; a step of a set of stairs; a safety barrier; a balustrade; a counter; etc.

The visible elements may be decorations and/or any type of pattern, sign or data item whether written, illustrative, decorative, an advertisement, etc.

According to the invention, the glazing unit comprising sheets of glass and of plastic laminated between the glass sheets, and luminophores, is characterized in that it comprises at least three glass sheets and at least two plastic films inserted in alternation between the glass sheets.

It will be recalled that the prior art relates to the windshields of automotive vehicles for which the glazing units used contain only two glass sheets, the illumination of the luminophores procuring no particular effect.

However, the Applicant has demonstrated that, in a laminated glazing unit incorporating luminophores, selecting at least three glass sheets associated with at least two intermediate films of plastic unexpectedly allows a three-dimensional image to be obtained.

The effect thus produced is surprising.

The invention therefore has the advantage of conferring a relief effect on the displayed image, opening up many applications in the architectural field.

Luminophores delivering different colors may especially be used, for example to produce a multi- or single-color decoration in the foreground, on a uniform background of another color.

Luminophores providing the same color may also be used with respect to two patterns of different graphic design placed on top of each other, the invention allowing the patterns to be distinguished because the luminophores are placed at two different depths of field.

Furthermore, the glazing unit of the invention allows the luminophores to be separated because they are associated with different (glass or plastic) substrates. Firstly, this has the advantage of making it possible to excite the luminophores located in different planes separately, and thus for example to produce images that vary over time via sequential illumination of the patterns.

This arrangement of the luminophores in successive planes also has the advantage of making it possible to separate luminophores that, if they were in contrast in the same plane, would run the risk of interacting negatively, one degrading the other via a chemical reaction for example.

The luminophores are introduced into the interior of the glazing unit on or in at least one of the plastic films and/or on at least one of the glass sheets.

The luminophores are distributed over all the area of the plastic film or glass sheet with which they are associated, and/or zonally in order to delimit patterns. The term "patterns" is understood to mean any graphical representations, such as drawings, writing, logos, etc.

The luminophores may be of different types, able to emit in different colors.

The luminophores may be organic or inorganic luminophores.

Advantageously, the luminophores are excitable under illumination by visible (wavelength longer than 400 nm) or UV radiation, preferably UV radiation near the visible in order to save energy and improve the safety of the system.

The luminophores are deposited, without being limited to the following deposition methods, for example by screen printing, roller, laminar flow coating or spraying or indeed inserted into the plastic material during its extrusion.

The plastic films may be monolayer or multilayer films.

The plastic films are for example made of polyvinyl butyral (PVB), polyvinyl chloride (PVC), polyethylene terephthalate (PET), ethylene vinyl acetate (EVA), polyurethane (PU).

According to one feature, the glass sheets may have different thicknesses; in particular the one or more internal glass sheets located in the interior of the system are thicker than the external glass sheets. This configuration further reinforces the depth effect and further emphasizes the relief effect of foreground patterns.

In one embodiment, at least one glass sheet comprises a low-index or reflective layer. The exciting illumination is delivered via the edge face of the glazing unit and is focused onto one particular plastic sheet, especially by virtue of reflective or low-index layers arranged on the glass on either side of said plastic sheet. Thus, the illumination will possibly be delivered to a specific plane containing luminophores in order to make this plane apparent to the observer, the illumination than being turned off in order to excite another plane, etc.

The invention also relates to an assembly comprising a glazing unit as described above and an illuminating device able to excite the luminophores, characterized in that the illumination is arranged facing a general face of the glazing unit and/or facing the edge face of at least one of the glass sheets and/or of a plastic film.

The illuminating device emits visible or UV radiation, and preferably UV radiation near the visible.

The illuminating device may comprise a plurality of illuminating systems in order to interact with the glazing unit in various illuminating directions.

An illuminating system associated with the edge face of one of the glass or plastic elements of the glazing unit is preferably formed from light-emitting diodes.

The adjective "external" is used in the rest of the description to mean facing the exterior environment of the element to which it relates, respectively.

The adjective "internal" relates to a portion turned toward the interior of the element to which it relates.

The present invention is now described by way of merely illustrative and completely nonlimiting examples of the scope of the invention, and with reference to the appended illustrations in which.

Figure 1:
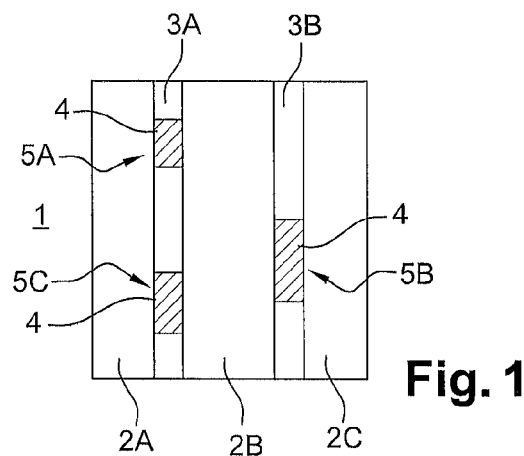
FIG. 1 shows a schematic partial cross-sectional and side view of a glazing unit of the invention incorporating luminophores.
Figure 2:
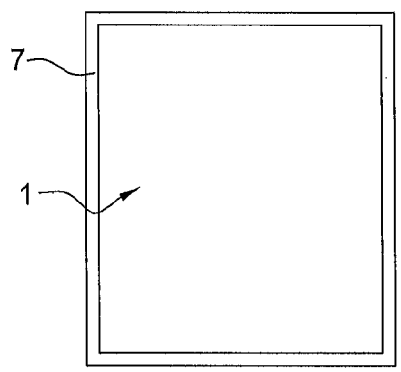
FIG. 2 is a front view of a glazing unit according to the invention, for which the luminophores are not excited.
Figure 3:
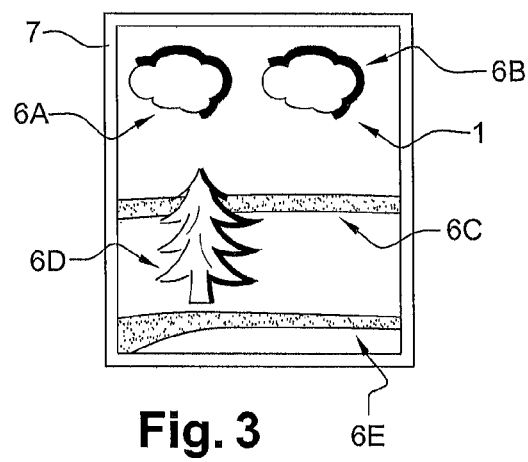
FIG. 3 shows the view in FIG. 2, the luminophores being excited by suitable radiation so that images are displayed in relief.

The glazing unit illustrated in FIGS. 1 to 3 is according to the invention a laminated glazing unit incorporating luminophores, and is more particularly used in the architectural field without however being limited to this field of application.

The structural configuration of the glazing unit of the invention, combined with the luminophores, provides either a transparent glazing unit, such as shown in FIG. 2, when the luminophores are not excited, or a glazing unit on which an image is displayed in relief, such as illustrated in FIG. 3, when the luminophores are excited by suitable illumination in order to make them luminesce (emit light) in the range of wavelengths of the visible.

FIG. 1 illustrates a cross-sectional and side view of a vertical portion of the laminated glazing unit 1 incorporating luminophores.

The glazing unit 1 comprises at least three glass sheets or glazing substrates 2A, 2B and 2C, and at least two plastic films 3A and 3B, each plastic film being inserted with a glazing substrate by being securely fastened thereto.

Two glazing substrates 2A and 2C are placed by way of external elements of the glazing unit, whereas the third glazing substrate 2B is arranged between the two external substrates and securely fastened to the latter by the two respective films of plastic material 3A and 3B.

According to the invention, the glazing unit may comprise more glazing substrates. If n is the number of glazing substrates, the glazing unit then comprises (n-1) plastic films, each plastic sheet being sandwiched between two glazing substrates, the external elements of the glazing unit preferably consisting of two glazing substrates.

Figure 4:
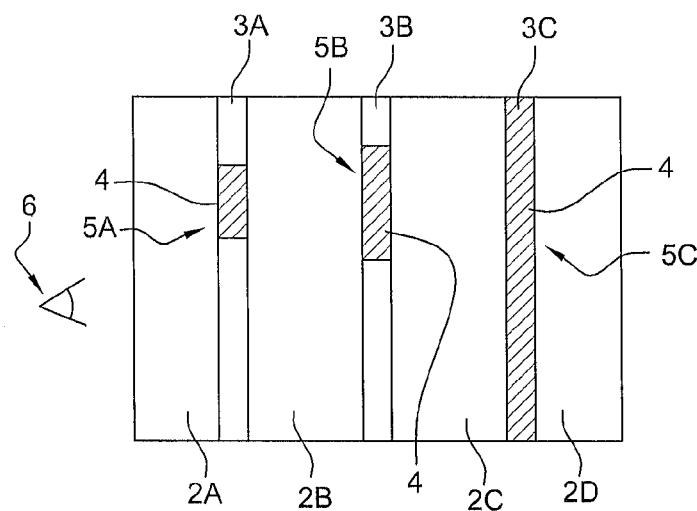
FIG. 4 illustrates another example embodiment of a glazing unit of the invention.

FIG. 4 illustrates another example embodiment in which the glazing unit comprises four glass sheets 2A to 2D separated by three plastic films 3A to 3C.

Each plastic film may be a monolayer or multilayer film composed of a superposition of a plurality of plastic sheets.

Each film may be completely transparent or even completely or partially tinted.

The plastic is for example chosen from the following: polyvinyl butyral (PVB), polyvinyl chloride (PVC), polyurethane (PU), ethylene vinyl acetate (EVA) or even polyethylene terephthalate (PET). These plastics may be joined together in order to form a multilayer film.

The glazing unit comprises luminophores 4 that are areally distributed in a plurality of zones 5A, 5B, 5C that each has a perimeter that corresponds to a pattern representing an image, writing, or any other graphical representation. FIG. 3 schematically illustrates the images in relief 6A to 6E obtained by suitable distribution of the luminophores inside the glazing unit and in various planes (glass or plastic film) and by exciting the luminophores with illumination.

The luminophores are arranged on at least one of the films, on each film or on only some of them.

The luminophores may be distributed over the entirety 5C of the area of a film, as illustrated in FIG. 4. This film is for example that film 3C furthest from an observer 6 looking at the glazing unit from in front of the first external substrate 2A. The excited luminophores 4 then deliver a colored background over the entire area 50.

The luminophores 4 are introduced into the interior of the glazing unit on or in the plastic films or on the glazing substrates. They are deposited on a plastic film or on a glazing substrate by any known method, such as screen printing, roller, laminar flow coating or spraying, or even by extrusion during the manufacture of the films.

The luminophores may be organic, for example derivatives of naphthalimide, benzoxazole, benzothiazole or benzoxazinone, or rare-earth complexes, or inorganic, generally oxides doped with rare earths.

An illuminating device 7, such as a frame associated with the edge face of the glazing unit and comprising one or more illuminating systems, light-emitting diodes (LEDs) for example, is associated with the glazing unit (FIGS. 2 and 3). The illumination allows the luminophores to be excited so that they in turn emit light in the range of the visible.

The luminophores may also be illuminated, in combination or as an alternative to illumination from the edge face of the glazing unit, from in front of one of the faces of the glazing unit.

The excitation of the luminophores in order to obtain the luminescence is obtained under radiation with a wavelength located in the visible, or in the ultraviolet (UV), preferably ultraviolet near the visible, between 365 and 405 nm, in order to limit power consumption and alleviate safety problems.

The luminophores may possess different emission wavelengths, thereby generating graphical representations of various colors. It is for example possible to produce a uniform background of a certain color on which specific patterns of different colors are positioned in the foreground.

Moreover, it may be envisioned to add reflective or low-index layers to certain glass sheets; and to arrange focused illumination on each of the luminophore-bearing elements, so as to make, through the thickness of the glazing unit, luminescent planes appear independently of one another by illuminating only that supporting (film or glass) element for which luminophore emission is desired. Thus, the reflective or low-index layers play a barrier role with respect to luminophores located in adjacent supporting elements, which luminophores need not be excited.

The thickness of the glazing substrates depends on the desired perspective effect.

The thickness of the glazing substrates also depends on how the glazing unit is to be used in/integrated into its environment.

The desired image is produced (FIG. 3) by suitably distributing luminophores over the surface with which they are associated. Furthermore, by choosing the element of the glazing unit on which they are arranged, i.e. by selecting the depth at which the luminophores are placed relative to that face of the glazing unit which is observed, while adapting the thicknesses of the glazing substrates, different planes are created in the overall image displayed. Thus, it is possible to produce a colored background on which a middle ground pattern is displayed in combination with another foreground pattern.

An example glazing unit according to the invention comprises the following stack: glass/PVB/glass/PVB/glasss, the thickness of the internal glass being 6 mm and the thickness of the external glazing substrates being 2 mm. The PVB is commercially available PVB.

The luminescent patterns are obtained by spraying, through masks onto the internal faces of the external glazing substrates, commercially available organic luminophores dissolved in tetrahydrofuran (THF) solvent.

The commercially available luminophores are for example:

Tinopal OB® from BASF for the color blue;
Lumilux CD797® from Honeywell for the color green; and
Lumilux CD332® from Honeywell for the color red.

After stacking of the glass and plastic sheets, the stack is laminated by placing it under vacuum in a vacuum bag and baking it in an autoclave at 140° C./10 bar for 2 h.

The illuminating device is formed from LEDs emitting at 405 nm. The LEDs are arranged on carriers that are for example mounted by clip fastening to onto the edge face of the glazing unit.

The invention claimed is:

1. A glazing unit comprising sheets of glass and of plastic laminated between the glass sheets, and luminophores, wherein the glazing unit comprises at least three glass sheets and at least two plastic films inserted in alternation between the at least three glass sheets, and wherein the luminophores are placed at different depths within the glazing unit so that a first part of the luminophores is separated from a second part of the luminophores by at least one of the at least three glass sheets, wherein the luminophores of the first part of the luminophores are distributed at a first depth of the glazing unit according to a first pattern and the luminophores of the second part of the luminophores are distributed at a second depth of the glazing unit according to a second pattern and wherein the first pattern is different from the second pattern.

2. An assembly comprising a glazing unit as claimed in claim 1 and an illuminating device configured to excite the luminophores, wherein illumination provided by the illuminating device is arranged facing a general face of the glazing unit or facing an edge face of the glazing unit, or both facing the general face of the glazing unit and the edge face of the glazing unit.

3. The assembly as claimed in claim 2, wherein the illuminating device is configured to emit visible or UV radiation.

4. The assembly as claimed in claim 3, wherein the illuminating device is configured to emit UV radiation near the visible.

5. The assembly as claimed in claim 2, wherein the illumination is arranged facing at least one of the at least three glass sheets or at least one of the at least two plastic films or both at least one of the at least three glass sheets and at least one of the at least two plastic films.

6. The assembly as claimed in claim 2, wherein the illuminating device comprises a plurality of illuminating systems to provide illumination in different illuminating directions.

7. The assembly as claimed in claim 2, wherein the first part of the luminophores and the second part of the luminophores are separately excitable by the illuminating device.

8. The glazing unit as claimed in claim 1, wherein the luminophores are excitable under illumination by visible or UV radiation.

9. The glazing unit as claimed in claim 8, wherein the luminophores are excitable under illumination by UV radiation near the visible.

10. The glazing unit as claimed in claim 1, wherein the at least three glass sheets have different thicknesses.

11. The glazing unit as claimed in claim 10, wherein one or more internal glass sheets of the at least three glass sheets is or are thicker than external glass sheets of the at least three glass sheets.

12. The glazing unit as claimed in claim 1, wherein the luminophores are introduced into an interior of the glazing unit on or in at least one of the at least two plastic films or on at least one of the at least three glass sheets, or both on or in at least one of the at least two plastic films and on at least one of the at least three glass sheets.

13. The glazing unit as claimed in claim 1, wherein the luminophores are distributed over all the area of the plastic film or glass sheet with which the luminophores are associated, or zonally in order to delimit patterns or both over all the area of the plastic film or glass sheet with which the luminophores are associated and zonally in order to delimit patterns.

14. The glazing unit as claimed in claim 1, wherein the luminophores are of different types, able to emit in different colors.

15. The glazing unit as claimed in claim 1, wherein the luminophores are organic or inorganic luminophores.

16. The glazing unit as claimed in claim 1, wherein at least one glass sheet of the at least three glass sheets comprises a low-index or reflective layer.

17. The glazing unit as claimed in claim 1, wherein the first pattern corresponds to all the area of the plastic film or glass sheet with which the luminophores of the first part of the luminophores are associated.

18. A glazing unit comprising a first, a second and a third sheet of glass and a first and a second plastic film laminated between the first, the second and the third sheet of glass so that the first plastic film is inserted between the first and the second sheet of glass and the second plastic film is inserted between the second and the third sheet of glass, and luminophores arranged at different depths within the glazing unit so that a first part of the luminophores is associated with one of the first, second and third sheets of glass or one of the first and second plastic films and a second part of the luminophores is associated with another one of the first, second and third sheets of glass or another one of the first and second plastic films, wherein the luminophores of the first part of the luminophores are distributed at a first depth of the glazing unit according to a first pattern and the luminophores of the second part of the luminophores are distributed at a second depth of the glazing unit according to a second pattern and wherein the first pattern is different from the second pattern.

19. The glazing unit as claimed in claim 18, wherein the luminophores are of different types, able to emit in different colors.

20. The glazing unit as claimed in claim 18, wherein the luminophores are organic or inorganic luminophores.

21. The glazing unit as claimed in claim 18, wherein the luminophores are excitable under illumination by visible or UV radiation.

22. The glazing unit as claimed in claim 18, wherein the first, second and third sheets of glass have different thicknesses.

23. The glazing unit as claimed in claim 18, wherein at least one of the first, second and third sheets of glass comprises a low-index or reflective layer.

24. The glazing unit as claimed in claim 18, wherein the first pattern corresponds to all the area of the first plastic film with which the luminophores of the first part of the luminophores are associated.

* * * * *